United States Patent
Kim

(10) Patent No.: US 10,183,655 B1
(45) Date of Patent: Jan. 22, 2019

(54) MONOBLOC MOUNTING BRACKET FOR FOOT PARKING BRAKE

(71) Applicant: DONGWOUN INDUSTRIAL CO., LTD., Ansan-si, Gyeonggi-do (KR)

(72) Inventor: Ho Jin Kim, Anyang-si (KR)

(73) Assignee: DONGWOUN INDUSTRIAL CO., LTD., Ansan-si (KR)

( * ) Notice: Subject to any disclaimer, the term of this patent is extended or adjusted under 35 U.S.C. 154(b) by 0 days.

(21) Appl. No.: 15/656,751

(22) Filed: Jul. 21, 2017

(51) Int. Cl.
| | | |
|---|---|---|
| *B60T 7/06* | (2006.01) | |
| *B60T 7/04* | (2006.01) | |
| *F16C 1/10* | (2006.01) | |
| *G05G 1/44* | (2008.04) | |
| *G05G 1/30* | (2008.04) | |

(52) U.S. Cl.
CPC ............................. *B60T 7/06* (2013.01); *B60T 7/04* (2013.01); *B60T 7/045* (2013.01); *B60T 7/047* (2013.01); *F16C 1/102* (2013.01); *G05G 1/30* (2013.01); *G05G 1/44* (2013.01); *B60Y 2304/05* (2013.01); *B60Y 2304/07* (2013.01); *B60Y 2410/122* (2013.01)

(58) Field of Classification Search
CPC ... B60T 7/045; B60T 7/06; B60T 7/04; B60T 7/047; G05G 1/30; G05G 1/44
See application file for complete search history.

(56) References Cited

U.S. PATENT DOCUMENTS

| | | | | |
|---|---|---|---|---|
| 4,391,159 A | * | 7/1983 | Sellmeyer | B60T 7/047 74/516 |
| 4,841,798 A | * | 6/1989 | Porter | B60T 7/047 74/501.5 R |
| 5,533,420 A | * | 7/1996 | Perisho | B60T 7/047 74/501.5 R |
| 6,171,540 B1 | * | 1/2001 | Ibaragi | B29C 45/00 248/200 |
| 7,469,462 B2 | * | 12/2008 | Richardson | G05G 1/38 29/593 |
| 8,113,086 B2 | * | 2/2012 | Eckerle | B60T 7/06 74/512 |
| 9,115,846 B2 | * | 8/2015 | Maier | B60T 8/3685 |

(Continued)

FOREIGN PATENT DOCUMENTS

| | | |
|---|---|---|
| JP | 03-284456 A | 12/1991 |
| JP | 06-064506 A | 3/1994 |

(Continued)

*Primary Examiner* — Luis A Gonzalez
(74) *Attorney, Agent, or Firm* — Sughrue Mion, PLLC

(57) ABSTRACT

Disclosed is a monobloc mounting bracket for a foot parking brake. The mounting bracket includes a pedal arm connection plate having a shaft installation hole at one side of one surface so as to rotatably install one end of a shaft for pivotably installing the pedal arm; a fixation plate extended to be bent in one direction from a front end of the pedal arm connection plate and having one pair of fixation holes so as to be fixed to the dashboard via multiple fixation members; a release member extended rewards from a rear end of the pedal arm connection plate and provided to install the release member via pin; and a cable suspension plate extended to be bent in a direction opposite to the fixation plate from a lower end of the pedal arm connection plate and having a cable suspension hole so as penetrate and suspend one end of the cable.

4 Claims, 4 Drawing Sheets

(56) References Cited

U.S. PATENT DOCUMENTS

| 2004/0083847 | A1* | 5/2004 | Reese | B60T 7/06 |
| | | | | 74/512 |
| 2007/0227288 | A1* | 10/2007 | Ferenc | B60T 7/045 |
| | | | | 74/512 |
| 2017/0001605 | A1* | 1/2017 | Henck | B60T 7/045 |

FOREIGN PATENT DOCUMENTS

| JP | 2002-023872 A | 1/2002 |
| KR | 20-0117387 Y1 | 5/1998 |
| KR | 10-0890111 B1 | 3/2009 |
| KR | 10-2013-0126594 A | 11/2013 |
| KR | 10-1669633 B1 | 10/2016 |

* cited by examiner

MONOBLOC MOUNTING BRACKET FOR FOOT PARKING BRAKE

TECHNICAL FIELD

The present invention relates to a monobloc mounting bracket for a foot parking brake, and more particularly, to a monobloc mounting bracket for a foot parking brake, which constitutes a mounting bracket provided to pivotably install a pedal arm of a foot parking brake in a dashboard of a vehicle with a monobloc to reduce a weight of the mounting bracket and reduce manufacturing cost by decreasing the number of components through an integration type, thereby enhancing assemblability.

BACKGROUND ART

In general, a braking device of a vehicle may be divided into a deceleration main brake used for reducing a driving speed or for temporary parking and a parking brake used for long-time parking.

The parking brake serves to brake a rear wheel or a front wheel of a vehicle in order to maintain a parking state of the vehicle.

The parking brake may be divided into a hand parking brake which a driver actuates by pulling a brake lever with a hand and a foot parking brake which the driver actuates by stepping a brake pedal with a foot.

In recent years, with the increase in the number of luxury vehicles equipped with an automatic transmission, a foot parking brake device has been widely spread, which the driver actuates by stepping a separate brake pedal with the foot.

As one example thereof, the foot parking brake device is disclosed in Korean Patent Application No. 10-2007-0118419 and FIGS. 1 and 2 which are accompanied are diagrams illustrating a general foot parking brake device in the related art.

As illustrated in FIGS. 1 and 2, the general foot parking braking device 10 in the related art is provided to include a fixation brake 11 provided to be fixable to a dashboard (not illustrated) of a vehicle, a steel-made base plate 12 provided to be fixable to the fixation bracket 11 via multiple rivets, a steel-made pedal arm 15 pivotably provided at one side of the center via boss 13 and a shaft 14 by receiving one surface of the base plate 12, a cable 18 provided to one end is suspended and fixed to a cable guide member 16 fixed onto the other surface of the pedal arm 15 by burring processing and the other end is wired through a cable guide bracket 17 fixedly installed onto the bottom of a console box so as to actuate a brake for parking by being pulled to correspond to pivoting of the pedal arm 15, a fan-shaped positioning member 21 provided to have multiple stop grooves 21*a* so as to fix the pedal arm 15 by suspending one end to a release member 20 in which one is pivotably installed to a cover plate 19 when the pedal arm 15 pivots by being fixed to one end of the pedal arm 15, and a pedal unit 23 fixed by welding the other end of the pedal unit 15 and provided while being covered with a pedal pad 22 so as for a user to step the pedal unit 23.

In the actuation of the foot parking brake device apparatus in the related art, which is constructed as described above, a driver steps the pedal unit of the pedal arm of which one end is projected to a driver's seat side while being fixed to the dashboard of the vehicle via the fixation bracket with applying force to allow the pedal arm to pivot via the boss and a shaft to the dashboard side in a vehicle room and pull a cable of which one end is suspended and fixed to the cable guide bracket through the pivoting of the pedal arm and in this case, when the user releases the foot from the pedal stepped thereby, the positioning member is suspended to a pedal arm fixing and releasing member, and as a result, the foot parking brake is actuated, therefore, thereby maintaining the vehicle in a parking state.

In this case, when the driver pushes the pedal unit of the pedal arm toward the dashboard side in order to intend to release the foot parking brake, the positioning member is released from the pedal arm fixing and releasing member, thereby restoring the pedal arm to restoring force of a restoring spring.

However, as described above, in the general foot parking brake device in the related art, which is configured as above, since the pedal arm is pivotably installed through the fixation bracket provided to be fixed to the dashboard and the steel-made base plate provided to be fixable to the fixation bracket via multiple rivets, a weight is increased due to the steel-made base plate, and as a result, fuel consumption cannot but be promoted and the assemblability cannot but being remarkably deteriorated due to the increase in the number of components.

SUMMARY OF THE INVENTION

The present invention has been made in an effort to provide a monobloc mounting bracket for a foot parking brake, which constitutes a mounting bracket provided to pivotably install a pedal arm of a foot parking brake in a dashboard of a vehicle with a monobloc to reduce a weight of the mounting bracket and reduce manufacturing cost by decreasing the number of components through an integration type, thereby enhancing assemblability.

Other objects of the present invention will be apparent as the description proceeds.

An exemplary embodiment of the present invention provides a monobloc mounting bracket for a foot parking brake, which enables the foot parking brake to be installed in a dashboard of a vehicle, the foot parking brake including a positioning member having multiple positioning grooves which are formed on an outer surface of the positioning member, a pedal arm connected to the positioning member and having a pedal unit which is covered with a pedal pad and made of a plastic material integrally, a cable in which one end is suspended to the pedal arm and the other end is wired through a cable guide bracket so as to actuate a brake for parking by pulling to correspond to pivoting of the pedal arm, and a release member provided to be suspended on and released from the positioning groove of the positioning member to correspond to the pivoting of the pedal arm, and the mounting bracket includes: a pedal arm connection plate, which is formed in a plate shape, having a shaft installation hole at one side of one surface so as to rotatably install one end of a shaft for pivotably installing the pedal arm; a fixation plate extended to be bent in one direction from a front end of the pedal arm connection plate and having one pair of fixation holes so as to be fixed to the dashboard via multiple fixation members; a release member connection plate extended rewards from a rear end of the pedal arm connection plate and provided to install the release member via pin; and a cable suspension plate extended to be bent in a direction opposite to the fixation plate from a lower end of the pedal arm connection plate and having a cable suspension hole so as penetrate and suspend one end of the cable.

Further, shaft reinforcing projection pieces having a dual-pipe shape, which are projected to in one direction so as to form a through-hole at the center to be in communication with the shaft installation hole so as to increase a hinge capability by an increase of a contact surface as the pedal arm is pivotably connected and installed through the shaft and connected to each other by multiple reinforcing ribs are further formed at one side of one surface of the pedal arm connection plate.

According to an exemplary embodiment of the present invention, a monobloc mounting bracket for a foot parking brake constitutes a mounting bracket provided to pivotably install a pedal arm of a foot parking brake in a dashboard of a vehicle with a monobloc to reduce a weight of the mounting bracket and reduce manufacturing cost by decreasing the number of components through an integration type, thereby enhancing assemblability.

DETAILED DESCRIPTION

Figure 1:
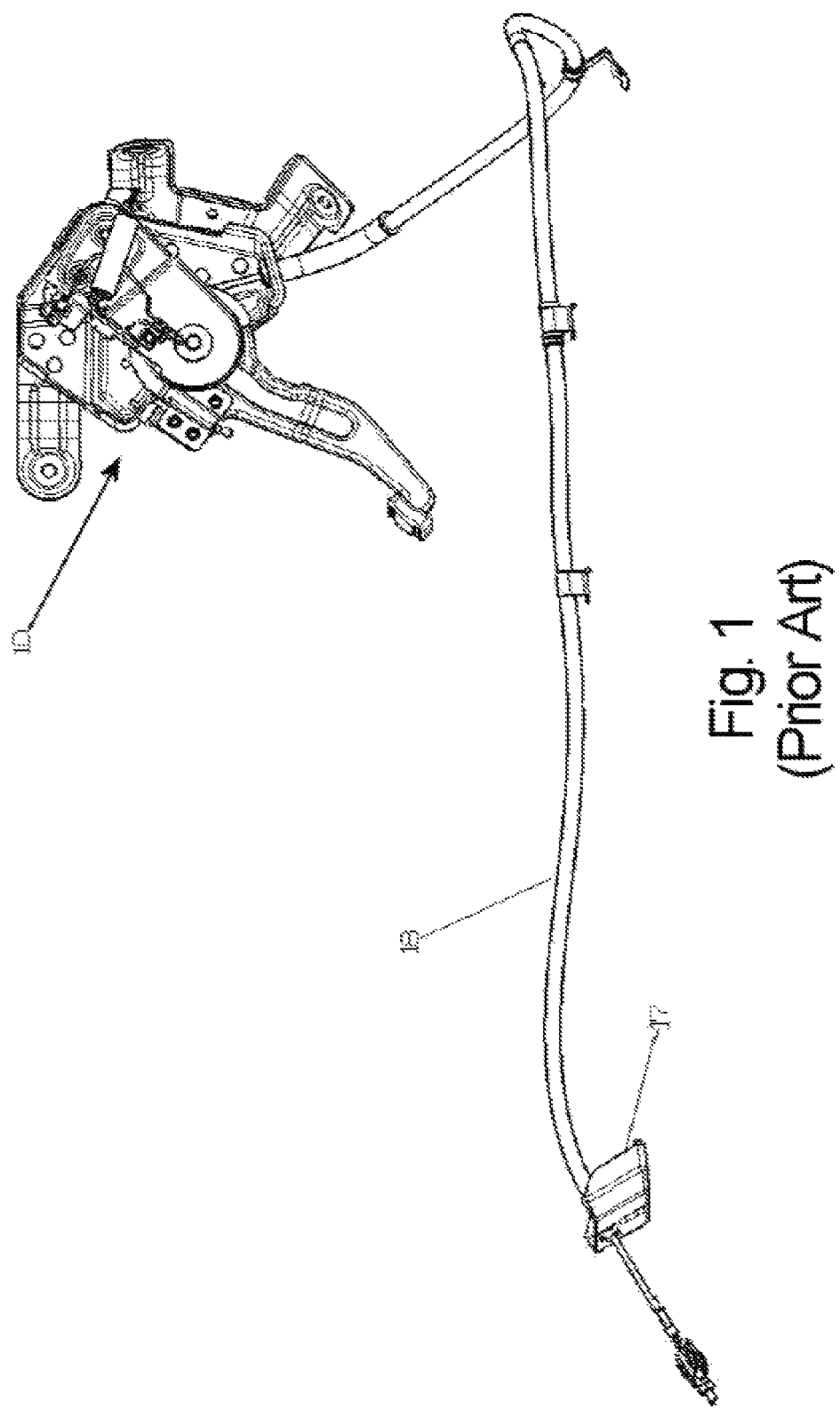
FIG. 1 is a perspective view of a general foot parking brake device in the related art.
Figure 2:
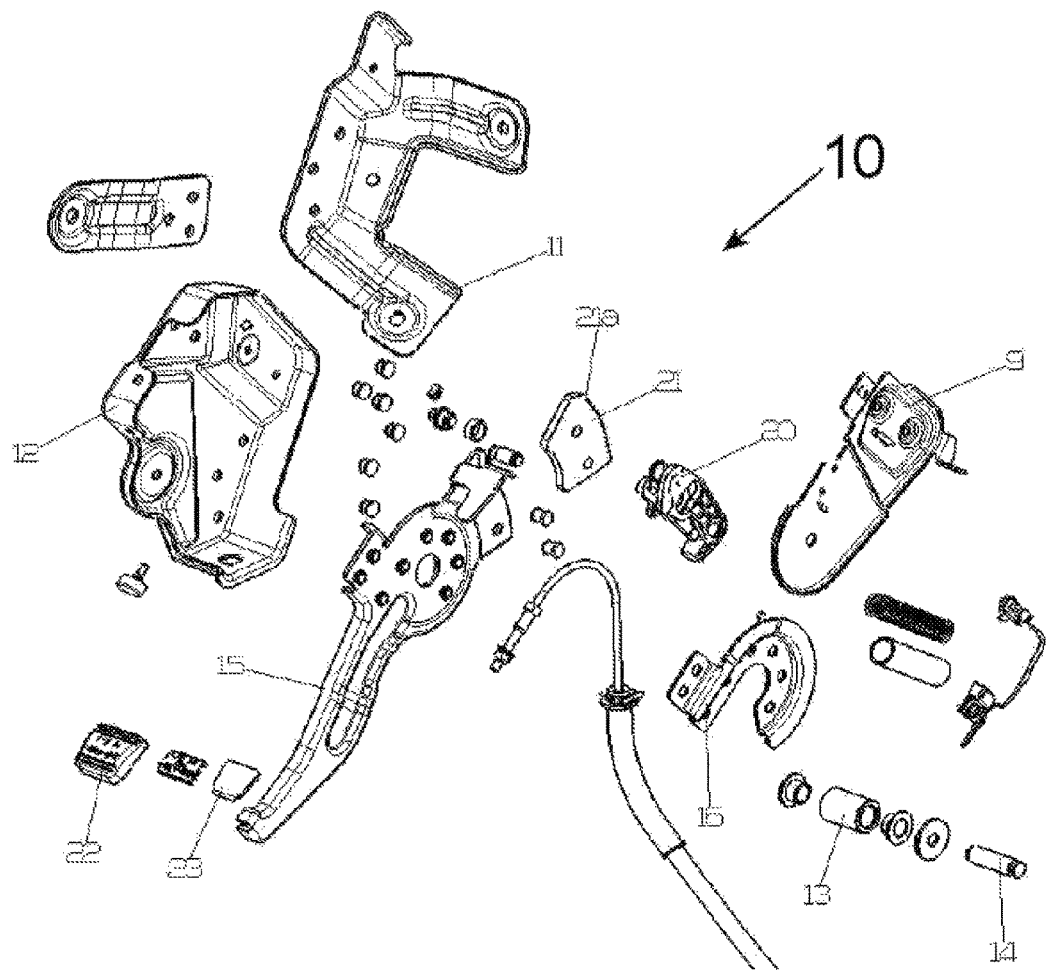
FIG. 2 is an exploded view of the general foot parking brake device in the related art.

Hereinafter, an exemplary embodiment of a monobloc mounting bracket for a foot parking brake according to the present invention will be described in detail.

First, among drawings, it should be noted that same constituent elements or components are represented by the same reference numerals. In describing the present invention, a detailed description of known functions and configurations incorporated will be omitted so as to avoid obscuring the gist of the present invention.

As illustrated in the drawings, according to the present invention, a monobloc mounting bracket for a foot parking brake, which enables the foot parking brake 70 to be installed in a dashboard of a vehicle, the foot parking brake 70 including a positioning member 20 having multiple pedal arm 30 connected to the positioning member 20 and having a pedal unit 31 which is covered with a pedal pad (reference numeral is omitted) and made of a plastic material integrally, a cable 40 in which one end is suspended to the pedal arm 30 and the other end is wired through a cable guide bracket 17 so as to actuate a brake for parking by pulling to correspond to pivoting of the pedal arm 30, and a release member 50 provided to be suspended on and released from the positioning groove 21 of the positioning member 20 to correspond to the pivoting of the pedal arm 30, and the mounting bracket includes: a pedal arm connection plate 110, which is formed in a plate shape, having a shaft installation hole 111 at one side of one surface so as to rotatably install one end of a shaft 60 for pivotably installing the pedal arm 30; a fixation plate 120 extended to be bent in one direction from a front end of the pedal arm connection plate 110 and having one pair of fixation holes 121 so as to be fixed to the dashboard via multiple fixation members; a release member connection plate 130 extended rewards from a rear end of the pedal arm connection plate 110 and provided to install the release member 50 via pin; and a cable suspension plate 140 extended to be bent in a direction opposite to the fixation plate 120 from a lower end of the pedal arm connection plate 110 and having a cable suspension hole 141 so as penetrate and suspend one end of the cable 40.

Further, shaft reinforcing projection pieces 150 having a dual-pipe shape, which are projected to in one direction so as to form a through-hole 151 at the center to be in communication with the shaft installation hole 111 so as to increase a hinge capability by an increase of a contact surface as the pedal arm 30 is pivotably connected and installed through the shaft 60 and connected to each other by multiple reinforcing ribs 152 are further formed at one side of one surface of the pedal arm connection plate 110.

Hereinafter, the monobloc mounting bracket for a foot parking brake according to the present invention will be described below in more detail with reference to the accompanying drawings.

Figure 3:
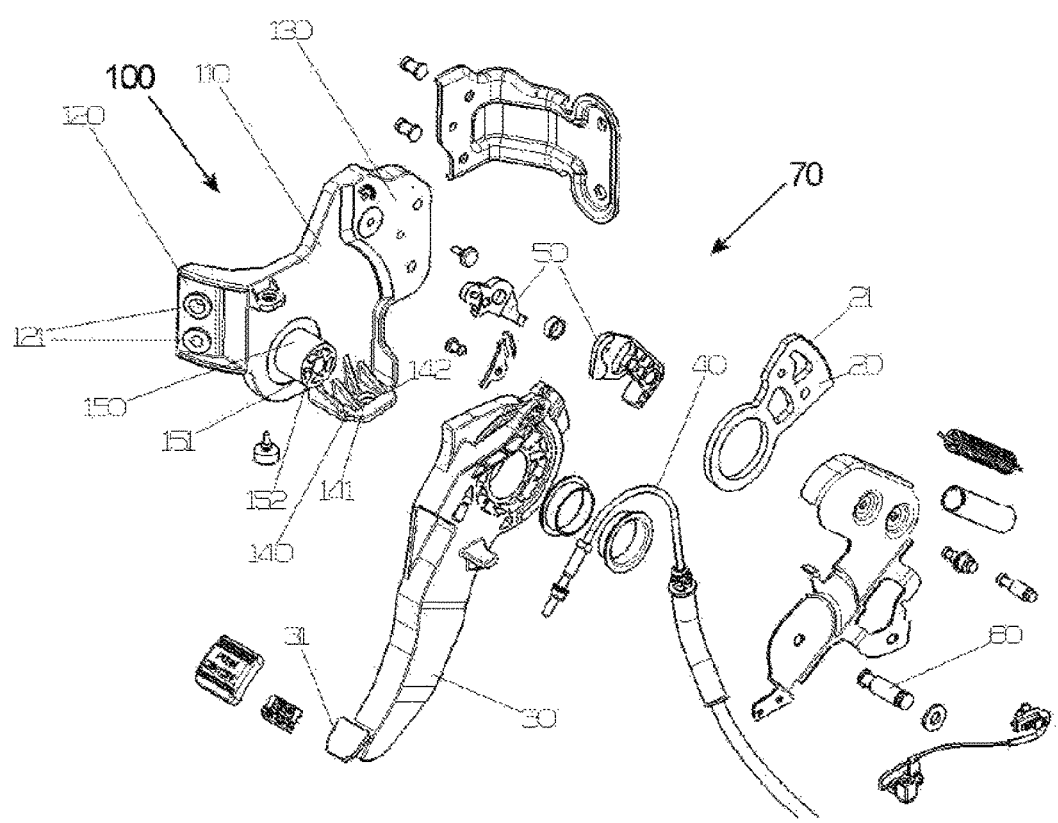
FIG. 3 is a diagram illustrating both a monobloc mounting bracket for a foot parking brake and a foot parking brake according to the present invention.
Figure 4:
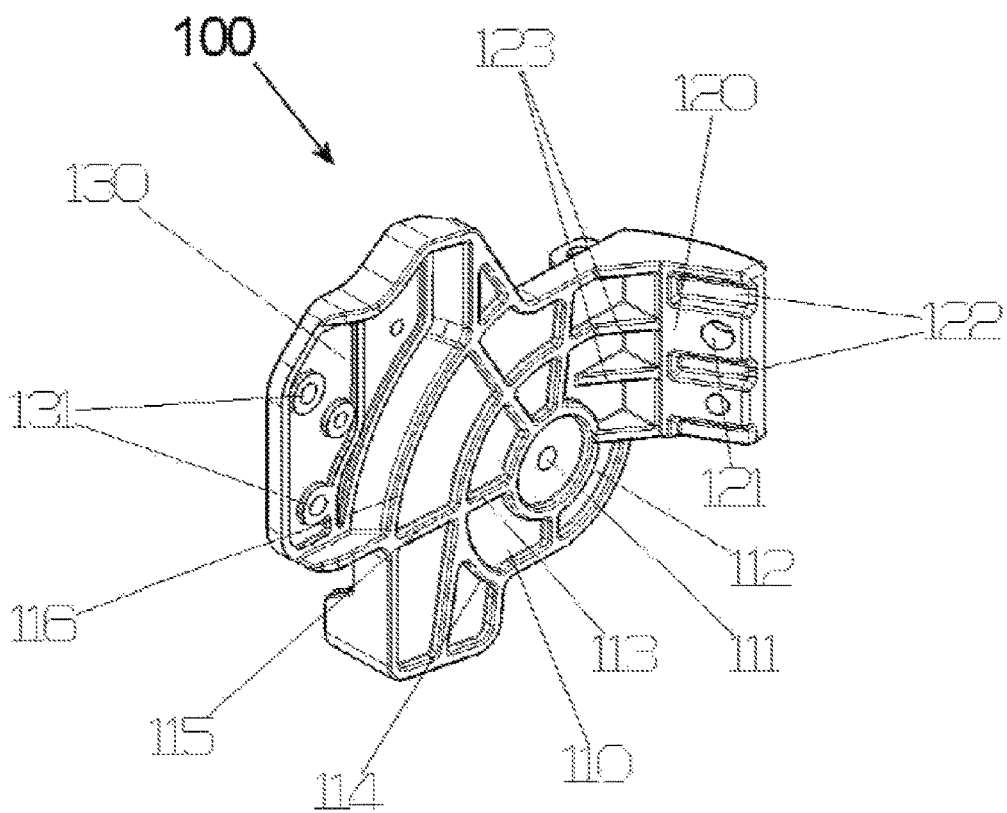
FIG. 4 is a bottom perspective view of the monobloc mounting bracket for a foot parking brake according to the present invention.

First, a pedal arm connection plate 110 of the monobloc mounting bracket for a foot parking brake according to the present invention is provided to install the pedal arm 30 to be pivotable via the shaft 60 as illustrated in FIGS. 3 and 4.

That is, the pedal arm connection plate 110, which has a plate shape, includes a shaft installation hole 111 formed on one side of one surface so as to install the pedal arm 30 to be connected to pivotable via the shaft 60, and a first reinforcing rib 112 having a ring shape to include the shaft installation hole 111 so as to reinforce rigidity with respect to vertical and horizontal directions, which is to be formed to be projected on the other surface, a second reinforcing rib 114 separated from the first reinforcing rib 112 and connected with the first reinforcing rib 112 through multiple first connection ribs 113, which is formed to be projected, and a third reinforcing rib 116 separated from the second reinforcing rib 114 and connected with the second reinforcing rib 114 through multiple second connection rib 115, which is formed to be projected on the other surface.

As illustrated in FIGS. 3 and 4, the fixation plate 120 is bent in one direction from the front end of the pedal arm connection plate 110 so as to be fixed to the dashboard via multiple fixation members.

That is, the fixation plate 120 is formed by a plate which is bent in one direction from the front end of the pedal arm connection plate 110 and has one pair of fixation holes 121 so as to be fixed to the dashboard via the fixation member such as a bolt and a nut or a screw and includes a rigidity reinforcing groove 122 formed between the A reinforcing groove 122 is formed between the one pair of fixation holes in order to reinforce the rigidity, which is formed on one surface of the fixation plate 120 vertically facing the other surface of the pedal arm connection plate 110.

Multiple fixation plate connection reinforcing ribs 123 are further formed in between one surface of the fixation plate 120 and the other surface of the pedal arm connection plate 110 so as to reinforce the rigidity of the fixation plate 120 at the time of fixing the one pair of fixation holes 121 to the dashboard exposure plate 110 via the fixation members.

The release member connection plate 130 is formed in a plate shape extending backward from an opposite direction to the rear end of the pedal arm connection plate 110, that is, a portion where the fixation plate 110 starts to be formed and a release member installation hole 131 is formed on the plate so as to install the release member 50 via pin or rivet as illustrated in FIGS. 3 and 4.

The cable suspension plate 140 is formed in a plate shape which extends to be bent in one direction from the lower end of the pedal arm connection plate 110, that is, a direction opposite to the fixation plate 120 and a cable suspension hole 141 is formed on the plate so as to penetrate and suspend one end of a cable 40 to be fixed to the pedal arm 30.

Further, multiple connection reinforcing ribs 142 are further formed between one surface of the cable suspension plate 140 and one surface of the pedal arm connection plate 110 so as to reinforce the rigidity of the cable suspension plate 140 by suspension of the cable 40 through the cable suspension hole 141.

In order to fix the foot parking brake to the dashboard of the vehicle by using the monobloc mounting bracket for a foot parking brake according to the present invention, one end of the cable is installed to be penetrated and suspended into the cable suspension hole 141 formed on the cable suspension plate 140 via the shaft and thereafter, the cable is fixed to the pedal arm 30 pivotably connected to a shaft reinforcing projection piece 150.

The release member 50 is fixedly installed in the release member installation hole 131 formed in the release member connection plate 130.

When the pedal arm is pivotably connected and the release member 50 is fixedly installed, the pedal arm is fixed to the dashboard through the fixation hole 121 formed in the fixation plate 120, thereby completing the installation of the foot parking brake.

As described above, the mounting bracket according to the present invention, which is used for fixedly installing the foot parking brake to the dashboard is constituted by a monobloc, and as a result, the foot parking brake may be rapidly and easily fixedly installed in the dashboard.

Further, the monobloc mounting bracket for a foot parking brake according to the present invention is molded and configured by a plastic material to enhance vehicle fuel efficiency depending on reduction of a weight.

The above description just illustrates the technical spirit of the present invention and various changes and modifications can be made by those skilled in the art to which the present invention pertains without departing from an essential characteristic of the present invention. Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be construed that all technical spirit in the equivalent range thereto is intended to be embraced by the scope of the present invention.

What is claimed is:

1. A monobloc mounting bracket for a foot parking brake, which enables the foot parking brake 70 to be installed in a dashboard of a vehicle, the foot parking brake 70 including:
    a positioning member 20 having multiple positioning grooves 21 which are formed on an outer surface of the positioning member 20,
    a pedal arm 30 connected to the positioning member 20 and having a pedal unit 31 which is covered with a pedal pad and made of a plastic material integrally,
    a cable 40 in which one end is suspended to the pedal arm 30 and the other end is wired through a cable guide bracket 17 so as to actuate a brake for parking by pulling to correspond to pivoting of the pedal arm 30, and
    a release member 50 provided to be suspended on and released from the positioning groove 21 of the positioning member 20 to correspond to the pivoting of the pedal arm 30, the mounting bracket comprising:

a pedal arm connection plate 110, which is formed in a plate shape, having a shaft installation hole 111 at a side of a surface so as to rotatably install an end of a shaft 60 for pivotably installing the pedal arm 30;
    a fixation plate 120 extended to be bent in one direction from a front end of the pedal arm connection plate 110 and having a pair of fixation holes 121 so as to be fixed to the dashboard via multiple fixation members;
    a release member connection plate 130 extended rewards from a rear end of the pedal arm connection plate 110 and provided to install the release member 50 via pin;
    a cable suspension plate 140 extended to be bent in a direction opposite to the fixation plate 120 from a lower end of the pedal arm connection plate 110 and having a cable suspension hole 141 so as penetrate and suspend an end of the cable 40; and
    a shaft reinforcing projection piece 150 having a dual-pipe shape, which is formed at a surface of the pedal arm connection plate 110 and projected to in one direction so as to form a through-hole 151 at the center to be in communication with the shaft installation hole 111,
    wherein the pedal arm 30 is pivotably connected to the shaft 60 through a dual-pipe of an inner pipe and an outer pipe, and
    wherein the inner pipe and the outer pipe are connected to each other by multiple reinforcing ribs 152.

2. The monobloc mounting bracket for a foot parking brake of claim 1, wherein the pedal arm connection plate 110 includes a first reinforcing rib 112 having a ring shape to include the shaft installation hole 111 so as to reinforce rigidity with respect to vertical and horizontal directions, which is to be formed to be projected on the another surface, a second reinforcing rib 114 separated from the first reinforcing rib 112 and connected with the first reinforcing rib 112 through a plurality of first connection ribs 113, which is formed to be projected, and a third reinforcing rib 116 separated from the second reinforcing rib 114 and connected with the second reinforcing rib 114 through a plurality of second connection ribs 115, which is formed to be projected on the other surface.

3. The monobloc mounting bracket for a foot parking brake of claim 2, wherein multiple connection reinforcing ribs 142 are further formed between a surface of the cable suspension plate 140 and the surface of the pedal arm connection plate 110 so as to reinforce the rigidity of the cable suspension plate 140 by suspension of the cable 40 through the cable suspension hole 141.

4. A monobloc mounting bracket for a foot parking brake, which enables the foot parking brake 70 to be installed in a dashboard of a vehicle, the foot parking brake 70 including:
    a positioning member 20 having multiple positioning grooves 21 which are formed on an outer surface of the positioning member 20,
    a pedal arm 30 connected to the positioning member 20 and having a pedal unit 31 which is covered with a pedal pad and made of a plastic material integrally,
    a cable 40 in which one end is suspended to the pedal arm 30 and the other end is wired through a cable guide bracket 17 so as to actuate a brake for parking by pulling to correspond to pivoting of the pedal arm 30, and
    a release member 50 provided to be suspended on and released from the positioning groove 21 of the positioning member 20 to correspond to the pivoting of the pedal arm 30, the mounting, bracket comprising:
a pedal arm connection plate 110, which is formed in a plate shape, having a shaft installation hole 111 at a side of a surface so as to rotatably install one end of a shaft 60 for pivotably installing the pedal arm 30;
a fixation plate 120 extended to be bent in one direction from a front end of the pedal arm connection plate 110 and having a pair of fixation holes 121 so as to be fixed to the dashboard via multiple fixation members;
a release member connection plate 130 extended rewards from a rear end of the pedal arm connection plate 110 and provided to install the release member 50 via pin; and
a cable suspension plate 140 extended to be bent in a direction opposite to the fixation plate 120 from a lower end of the pedal arm connection plate 110 and having a cable suspension hole 141 so as penetrate and suspend one end of the cable 40,
wherein the fixation plate 120 includes a rigidity reinforcing groove 122 on a surface of the fixation plate 120 vertically facing another surface of the pedal arm connection plate 110 between the pair of fixation holes 121 in order to reinforce rigidity and multiple fixation plate connection reinforcing ribs 123 so as to reinforce the rigidity of the fixation plate 120 for fixing the pair of fixation holes 121 to the dashboard via fixation members between a surface of the fixation plate 120 and the other surface of the pedal arm connection plate 110.

* * * * *